(12) United States Patent
Poddar et al.

(10) Patent No.: US 11,797,345 B2
(45) Date of Patent: Oct. 24, 2023

(54) HARDWARE ACCELERATOR FOR EFFICIENT CONVOLUTION PROCESSING

(71) Applicants: Prakash C R J Naidu, Ottawa (CA); Anakhi Hazarika, Jorhat (IN); Soumyajit Poddar, Kolkata (IN); Hafizur Rahaman, Howrah (IN)

(72) Inventors: Soumyajit Poddar, Kolkata (IN); Anakhi Hazarika, Jorhat (IN); Prakash C R J Naidu, Ottawa (CA); Hafizur Rahaman, Kolkata (IN)

(*) Notice: Subject to any disclaimer, the term of this patent is extended or adjusted under 35 U.S.C. 154(b) by 524 days.

(21) Appl. No.: 16/858,637

(22) Filed: Apr. 26, 2020

(65) Prior Publication Data

US 2020/0264935 A1    Aug. 20, 2020

Related U.S. Application Data

(60) Provisional application No. 62/840,421, filed on Apr. 30, 2019.

(51) Int. Cl.

| | |
|---|---|
| *G06F 9/50* | (2006.01) |
| *G06F 9/38* | (2018.01) |
| *G06N 20/10* | (2019.01) |
| *G06T 7/10* | (2017.01) |
| *G06N 3/063* | (2023.01) |
| *G06T 1/20* | (2006.01) |
| *G06N 3/045* | (2023.01) |

(52) U.S. Cl.
CPC .......... *G06F 9/5027* (2013.01); *G06F 9/3893* (2013.01); *G06N 3/045* (2023.01); *G06N 3/063* (2013.01); *G06N 20/10* (2019.01); *G06T 1/20* (2013.01); *G06T 7/10* (2017.01); *G06F 9/5044* (2013.01); *G06T 2207/20084* (2013.01)

(58) Field of Classification Search
CPC ........ G06N 20/00; G06N 20/10; G06N 20/20; G06N 3/02; G06N 3/04; G06N 3/0454; G06N 3/063; G06N 3/045; G06F 9/3893; G06F 9/5027; G06F 9/5044; G06T 1/20; G06T 7/10; G06T 2207/20084
See application file for complete search history.

(56) References Cited

U.S. PATENT DOCUMENTS

| | | | |
|---|---|---|---|
| 2018/0181406 A1* | 6/2018 | Kuramoto | ................ G06N 3/06 |
| 2019/0220742 A1* | 7/2019 | Kuo | ...................... G06N 3/063 |
| 2019/0236049 A1* | 8/2019 | Vantrease | .............. G06N 3/063 |
| 2019/0294413 A1* | 9/2019 | Vantrease | .............. G06N 3/063 |
| 2020/0074288 A1* | 3/2020 | Zhang | ...................... G06N 3/04 |

* cited by examiner

*Primary Examiner* — Shane D Woolwine

(57) ABSTRACT

An accelerator with a modified kernel design for convolution processing in a Convolutional Neural Network (CNN) model is disclosed wherein the convolution execution time is reduced. A kernel structure is disclosed in the embodiment for the convolution operations that improves the overall performance of a CNN. Further, two loading units for weight and pixel loading reduce the latency involved in loading the network parameters into the processing elements. Moreover, a controller has been designed and included in the system architecture to aid the functioning of loading units efficiently.

9 Claims, 6 Drawing Sheets

HARDWARE ACCELERATOR FOR EFFICIENT CONVOLUTION PROCESSING

STATEMENT REGARDING FEDERALLY SPONSORED RESEARCH OR DEVELOPMENT

The work on which the disclosure of this application is based is not funded by any Federally Sponsored Research or Development in the United States of America.

FIELD OF THE INVENTION

The present invention is directed to image processing in artificial vision systems using Convolutional Neural Network (CNN).

DESCRIPTION OF THE RELATED ART

Image processing in artificial vision systems uses the Convolutional Neural Network (CNN) as the state-of-the-art approach. Convolution processing units are basic building blocks of a CNN. Typical CNN model demands a plurality of multiply-accumulate (MACs) operations and network parameters (weight and pixel) resulting a high computation and memory intensive processing. Extremely high power and computational cost helps to attain the superior accuracy of CNNs. However, computational complexity creates an impediment in easy deployment of CNN in embedded environment.

GPU and FPGA based hardware accelerator assist general purpose processors to perform complex and intense computations efficiently. Optimal performance of the accelerator can be analyzed with big data computation. Previously, a few hardware architectures had proposed to accelerate CNN processing by including domain specific processing unit (PE) and accelerator with FPGA or ASIC implementation. The mismatch between the computation throughput and memory bandwidth of FPGA creates bottleneck in performance improvement. Zhang et. al. (2015) proposed a novel architecture for CNN accelerator on FPGA board to overcome this problem using the roofline model. The proposed CNN accelerator design is composed of several Processing Elements (PE), on chip buffer, external memory and interconnect. Organization of all components should be carefully done so that on chip data can process efficiently. This architecture is an ASIC implementation with 12×14 PEs and 108 KB scratchpad memory which achieves maximum computational efficiency of 92%, 80% and 93% on AlexNet layer 1, 2 and 3-5 respectively (Krizhevsky et. al., 2012). This accelerator delivers state-of-the art accuracy with minimum energy consumption by using two key methods: (1) efficient dataflow and supporting hardware (spatial array, memory hierarchy and on-chip network) that minimize data movement by exploiting data reuse and support different shapes; (2) exploit data statistics to minimize energy through zeros skipping/gating to avoid unnecessary reads and computations; and data compression to reduce off-chip memory bandwidth, which is the most expensive data movement. With significant improvement on the external memory bottleneck of previous architectures, Origami (Benini et. al., 2017) architecture achieves an efficiency of 74%. The hardware accelerator, AlScale (Struharik et. al., 2017) is rapid, dynamic and can implement various configurations of CNN efficiently. The architecture is based on full or partial 3D-convolutions which are composed of four modules: Reconfigurable Computing Unit (RCU), Input Stream Manager (ISM), Output Stream Manager (OSM) and CNN Cache (CNNC). Usage of MAC (Multiply-Accumulate) units offer greater flexibility in supporting different kernel configurations (different 3D convolution sizes, horizontal and vertical stride value etc.). This architecture also provides better utilization of the available on-chip computing resources (MAC units), due to the fact that every 3D-convolution calculation is localized to a single MAC unit or a small cluster of MAC units, that will result in faster instance processing. Snowflake architecture (Gokhale et. al., 2017) is composed of four major components namely Memory Interface, Data Distribution Network, Control Core and Compute Core. They have used 256 MAC unit to process the entire CNN network. Snowflake achieves 91% computational efficiency while processing AlexNet and GoogleNet (Szegedy et. al., 2015).

Du et. al. (Pub. No. US2018/0137414 A1) have divided the convolution operation in part and then summed up all partial convolved output. Wolf and Mushinsky (Pub. No. US2019/0042892 A1) have disclosed a CNN model to detect an object in an image. Mathew, Dasappan and Swami (Pub. No.: US2018/0181857 A1) have disclosed reducing the complexity of convolutions in CNNs. They have performed convolution by using block multiply accumulation (BMA) operation in which entire input data block is multiplied by each filter coefficient separately. Lim, Sugisawa and Wang (U.S. Pat. No. 9,858,636 B1) have disclosed a configurable convolution engine for streaming input data of various formats to perform convolution. Convolution engine includes circuits for raw image processing. Aydonat, Chiu and Ling (Pub. No.: US2017/0103299 A1) have disclosed a CNN accelerator that is modified to change a data flow between components of the CNN accelerator by utilizing one or more processing elements to implement a standard convolution layer. CN108805266A discloses design of reconfigurable CNN high concurrent convolution accelerator, comprising a weight address generating unit, result address generation unit and reconfigurable computing unit. CN107392308A discloses design of a basic structure of a convolution neural network on the programmable device and has established the quantification model of the computing resource. CN109447241A discloses accelerator architecture for IOT applications with primarily focus on cache structure. High degree of parallelism and high usage of processing element array are also the aims of the reported work. CN108182471A discloses a CNN inference accelerator. The accelerator comprises an input image buffer module which comprises N buffers for loading input image data of one row, and N×N operation units which are connected to an input image buffer module and are used for performing convolution operations. A bidirectional pulsation array is designed for data reusability brought by a convolutional neural network, the loading efficiency of the data is improved, and thus the convolutional neural network is accelerated. Dally et. al. (US20180046906) have disclosed a method wherein sparse weights are obtained after eliminating some non-essential weights by pre-processing. The sparse data is then encoded and some high dimension sparse weight vectors are compressed and processed parallelly by the processing elements to increase throughput. The addresses of the compressed sparse data are computed in parallel and combined with the processed results to reduce overall computation time. Culurciello et. al. (US20180341495) have disclosed using a plurality of vectorizing MAC units that have limited configurability options. KR20180123846A discloses an embodiment describing a storage reuse network of registers connected as a torus to shift input pixels into multiply accumulate units for a Convolutional Neural Network.

In summary, previously reported CNN hardware accelerators have drawbacks in their configurability, flexibility of implementing different CNNs, kernel field sizes, etc.

BRIEF SUMMARY OF THE INVENTION

Some aspects of the invention are related to reconfigurability of a hardware accelerator as an imperative solution to ameliorate the speed, power and memory requirement of CNN computation. Further, and in addition, some aspects of the invention are applicable to implementation of the invention to address the computational efficiency challenge by design of the accelerator architecture considering involved on-chip and off-chip memory and power along with modified kernel structure.

A modular, segmented, and thus reconfigurable hardware accelerator is disclosed wherein preferably, instead of conventional kernel size typically comprising of a square matrix with equal number of rows and columns, smaller segments of sub-matrices constitute multiple numbers of kernels that are run to process input pixels of an image. Further, preferably, but optionally and in addition, the numbers of smaller sized kernels are run concurrently to process the input pixels of the image.

According to a preferred embodiment of the invention, the numbers of kernels run concurrently to process the input pixels of the image may be identical. Those skilled in the art may appreciate that there can be several optional embodiments of the invention by implementation of several possible configurations of kernel structure based on the modularity and reconfigurability approach; and all the variants are covered under the spirit and scope of the disclosed invention.

Additional, but optional aspects further aiding the efficiency of the CNN computation are also disclosed. According to one aspect of the invention, a pixel loading unit is designed and included to load a number of input pixels into a larger number of MACs for effecting the convolution operation. By allowing use of more than one processing module depending on the size of input image, a flexible architecture is facilitated. According to another aspect of the invention, the loading units for prime computational parameters, namely, input pixels and weights help to mitigate latency gap in loading the computational parameters into the respective MAC unit from the on-chip memory and hence escalate the convolution processing speed. According to yet another optional but additional aspect of the invention, a controller has been designed and included in the system architecture to aid the functioning of loading units efficiently.

DETAILED DESCRIPTION OF THE INVENTION

A preliminary version of this invention was disclosed first as presented in: Anakhi Hazarika, Soumyajit Poddar, Hafizur Rahaman, "Hardware Efficient Convolution Processing Unit for Deep Neural Networks", 2nd International Symposium on Devices, Circuits, and Systems (ISDCS 2019), 06-8 Mar. 2019, Hiroshima University, Higashi-Hiroshima, Japan; the disclosure is fully incorporated by reference.

Figure 1:
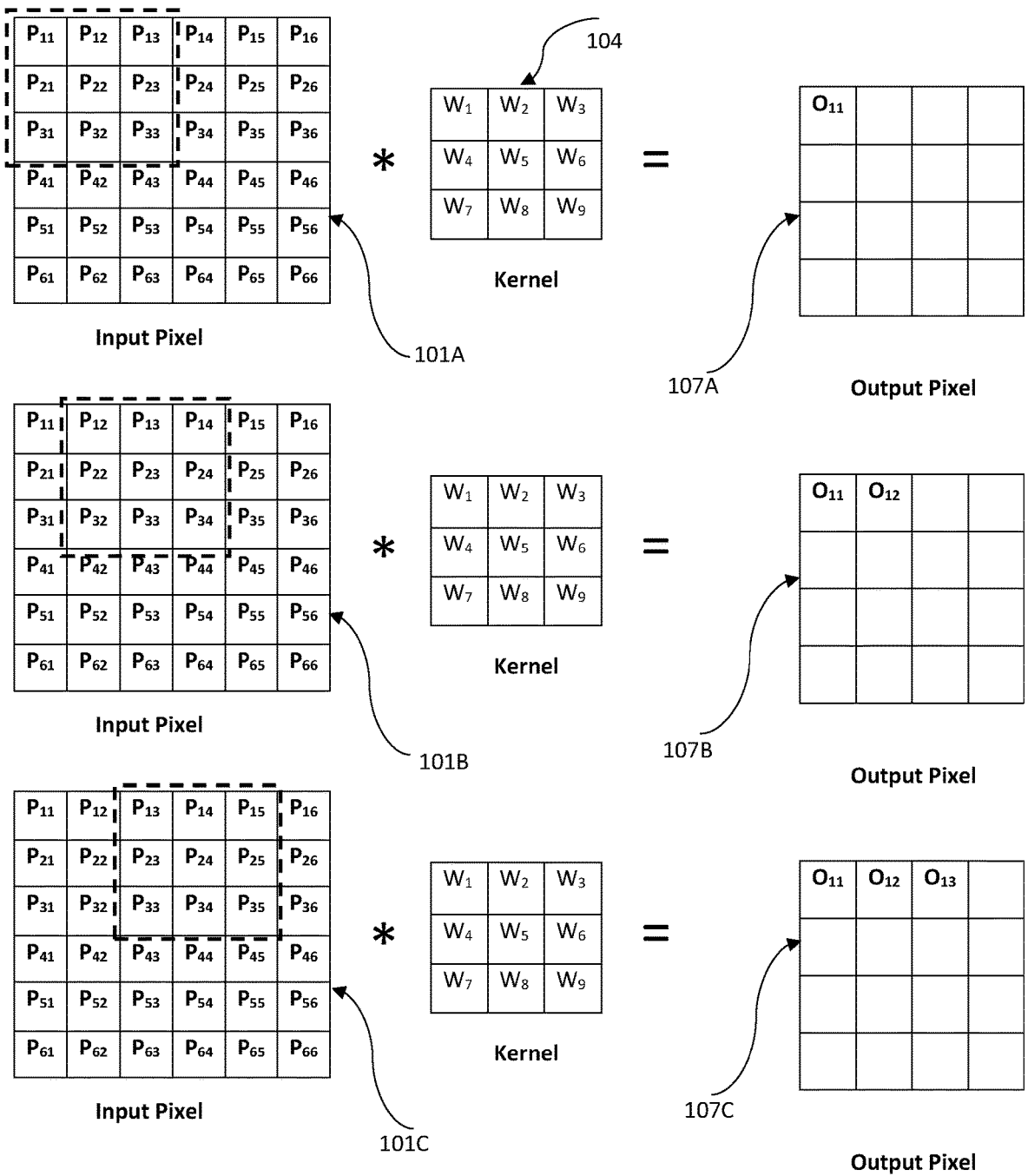
FIG. 1 shows typical kernel structure for convolution processing.

In typical CNN reported previously in prior art, convolution operation is carried out as shown in FIG. 1. After completion of three consecutive cycles, new three horizontal output pixels are formed.

We disclose a reconfigurable, low power accelerator architecture along with modified kernel structure.

A modular, segmented, and thus reconfigurable hardware accelerator is disclosed wherein preferably, instead of conventional k×k kernel (where k is number of rows and equal number of columns k), a plurality of (k×(<k)) kernels are run to process input pixels of an image. Further, preferably, but optionally and in addition, the plurality of (k×(<k)) kernels are run concurrently to process the input pixels of the image.

According to a preferred embodiment of the invention, the plurality of (k×(<k)) kernels run concurrently to process the input pixels of the image may be identical.

Figure 2:
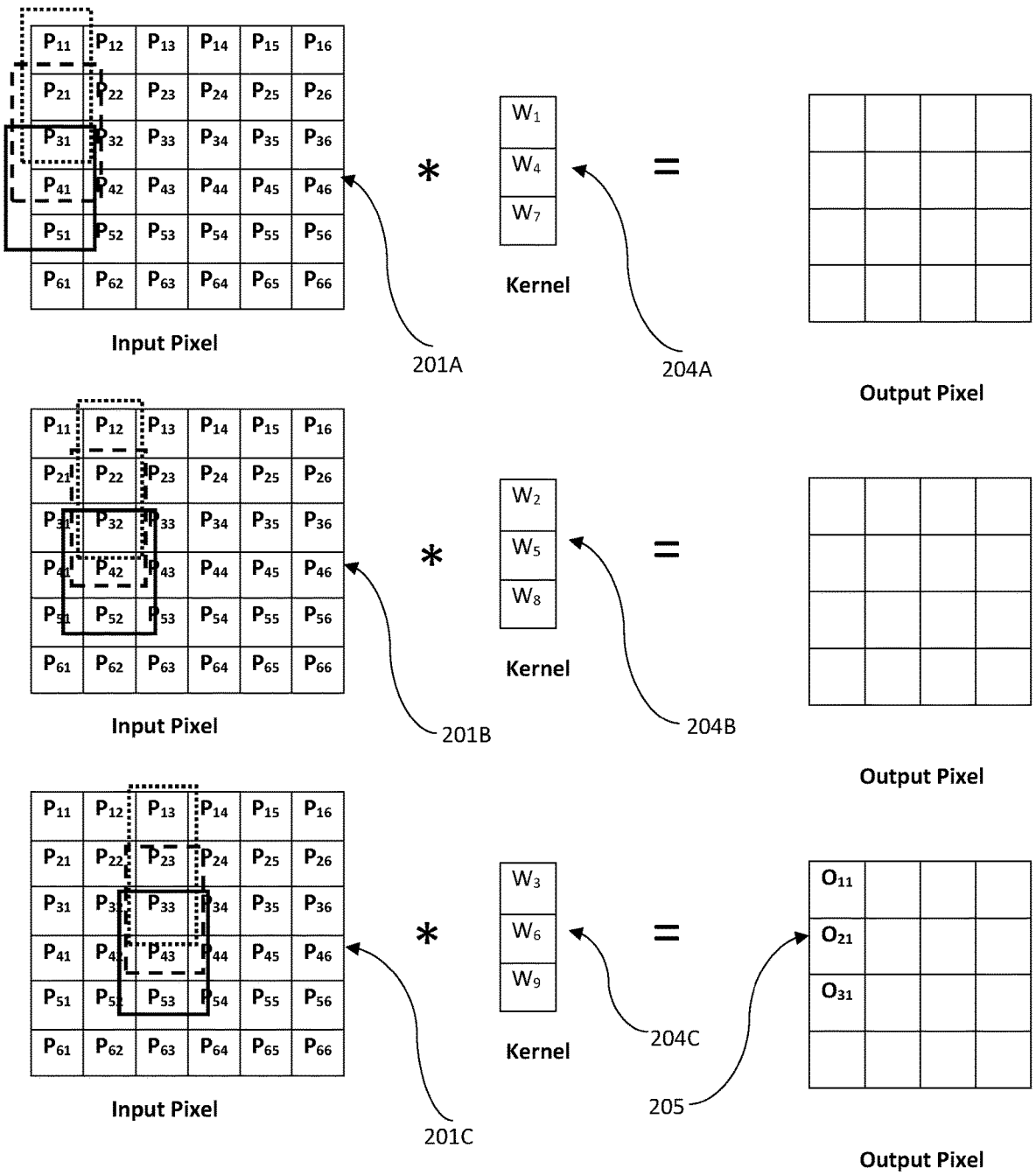
FIG. 2 illustrates convolution processing of new kernel structure being disclosed.

FIG. 2 illustrates an example of the convolution processing of disclosed kernel structure. Instead of conventional k×k kernel, we deploy three k×1 kernel as a segment of the original kernel to process the input image. In this, three similar k×1 kernels run simultaneously over the input pixels. The disclosed kernel design consumes less loading cycles to obtain three vertical output pixels, compared to conventional kernel design. These new kernels take the same time to process five input pixel rows, whereas typical kernel design can process only three rows. Thus, the modified kernel structure facilitates faster CNN processing.

Figure 3:
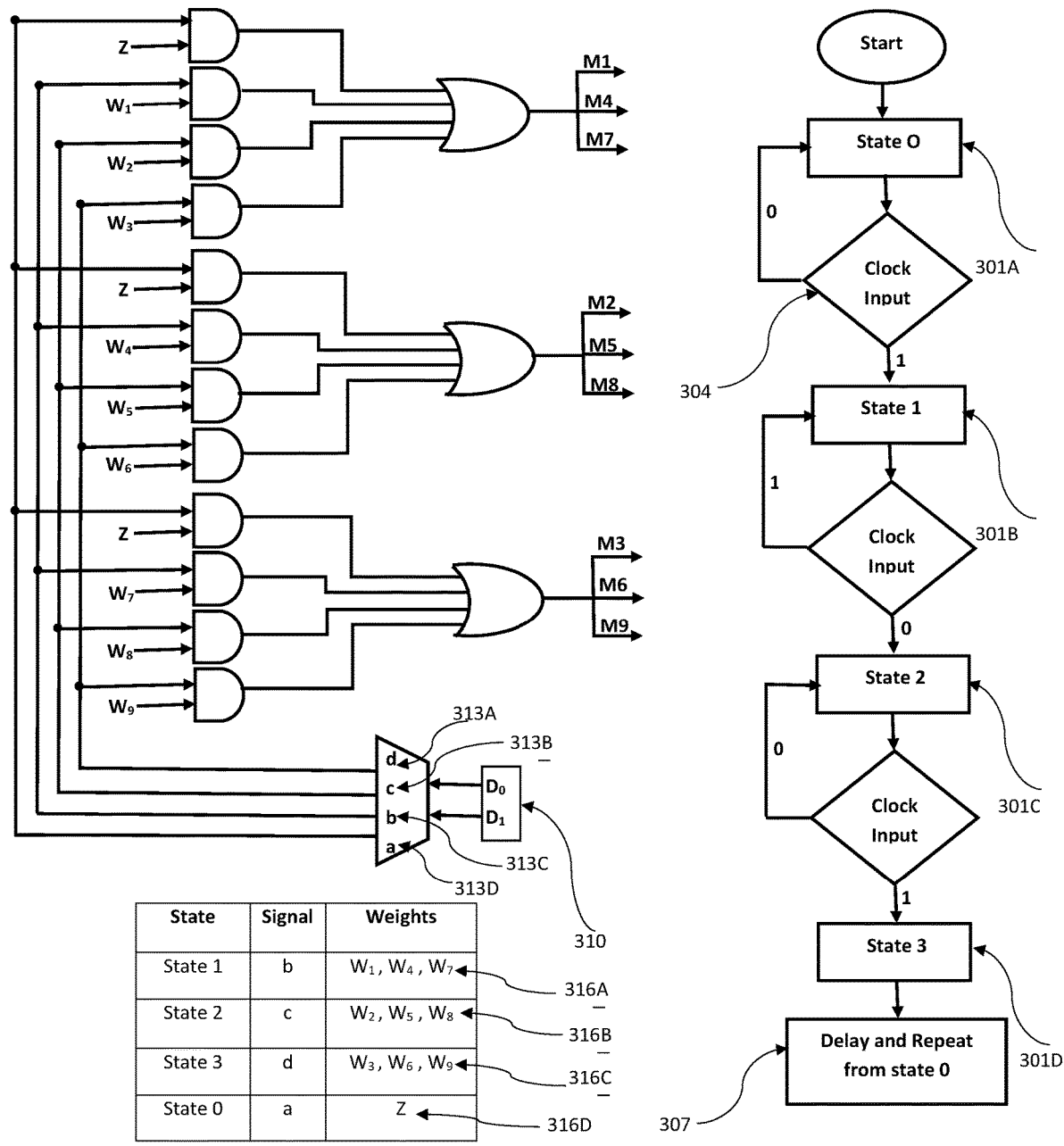
FIG. 3 and FIG. 4 show the schematic diagram of weight loading and the pixel loading units respectively.
Figure 4:
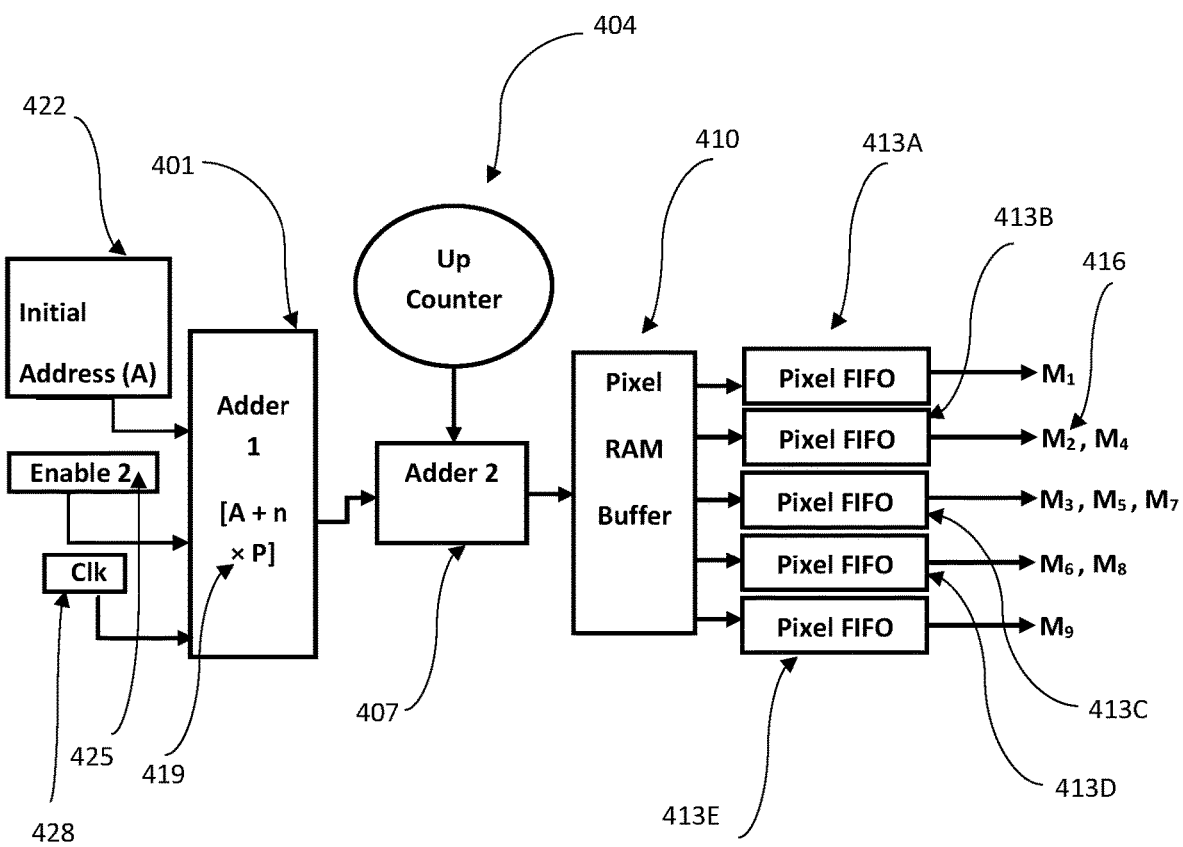

Additional, but optional aspects further aiding the efficiency of the CNN computation disclosed comprises of loading units. According to one aspect of the invention, a pixel loading unit is designed and included to load a number of input pixels into a larger number of MACs for effecting the convolution operation. According to another aspect of the invention, the loading units for prime computational parameters, namely, input pixels and weights help to mitigate latency gap in loading the computational parameters into the respective MAC unit from the on-chip memory and hence escalate the convolution processing speed. By allowing use of more than one processing module depending on the size of input image, a flexible architecture is facilitated. To boost the computational efficiency of the proposed kernel structure, we have developed two loading units for the prime computational parameters input pixels and weight. These two loading units help to mitigate the latency gap in loading the computational parameters into the respective MAC unit from the on-chip memory and hence escalate the convolution processing speed. A controller has also been designed to aid the functioning of loading units efficiently. FIG. 3 and FIG. 4 show the schematic diagrams of weight loading and the pixel loading unit respectively.

Firstly, weights of a 3×3 kernels are stored in nine on-chip single entry buffer connected to the logic circuit of the weight loading unit before the computation starts. D0 and D1 works as a weight selector controlled by a clock inputted mealy state machine. The logic circuit of the loading unit transfers three weights into the nine respective MAC unit at a time.

Similarly, the pixel loading unit is designed to load five input pixels into the nine MACs for convolution operation. In this architecture, all pixels of the input image are first arranged in a 1-D array and stored in a dual port on-chip RAM. Adder1 will compute the initial pixel addresses of first five rows of input and Adder2 will generate the addresses of pixels when the kernels move over the pixels horizontally. Number of state of the counter will depend on the size of the input image. Corresponding pixels of the generated addresses are stored in five pixel FIFO of depth three and width same as pixel size from where pixels can be loaded into the MACs. This architecture is reconfigurable as we can use more than one processing module depending on the size of input image.

The configuration and functioning of embodiments are described in the following paragraphs explaining the Figures in more detail.

In FIG. 1 (typical prior art), 101A is the input image pixels over which kernel moves. Here, 104 is placed over the first nine pixels of the image to perform convolution operation. 104 is a conventional 3×3 kernel structure used in CNN. In 101B and 101C, 104 slides horizontally over the input image by stride one and convolved with the next set of nine pixels. 107A, 107B and 107C are the output image pixels obtained after completing convolution operation of 101A, 101B and 101C respectively.

In FIG. 2, 204 (A/B/C) are the 3×1 modified kernels which are designed as a subset of conventional 3×3 CNN kernels. In 201A, three 204A are applied over the set of five input pixels. Convolution operation is performed in 9 MACs with three weights and five pixels. Similarly, in next two subsequent cycles, three kernels of each 204B and 204C performed convolution operations like 201B and 201C manner respectively. 207 represents convolved output pixels obtained at the end of three consecutive convolution processing cycles.

In FIG. 3, signal set 310 is considered as a weight selector controlled by four state mealy machine. Initially, 301A is considered as state zero where no weight is selected. When 304 become one, 310 changes its state to 301B and remains in the same state when 304 is zero. Transition to 301C from 301B occurs when 304 becomes zero and transitions to 301D from 301C occur when 304 become one. Unit 307 introduces delay while processing the convolution operations. When 310 is in state 301A, 313D gets activated and 316D loaded into the MACs. Weight set 316A, 316B, 316C are loaded in to the MACs when the signals 313C, 313B, 313A are got activated for the convolution operations.

Figure 6:
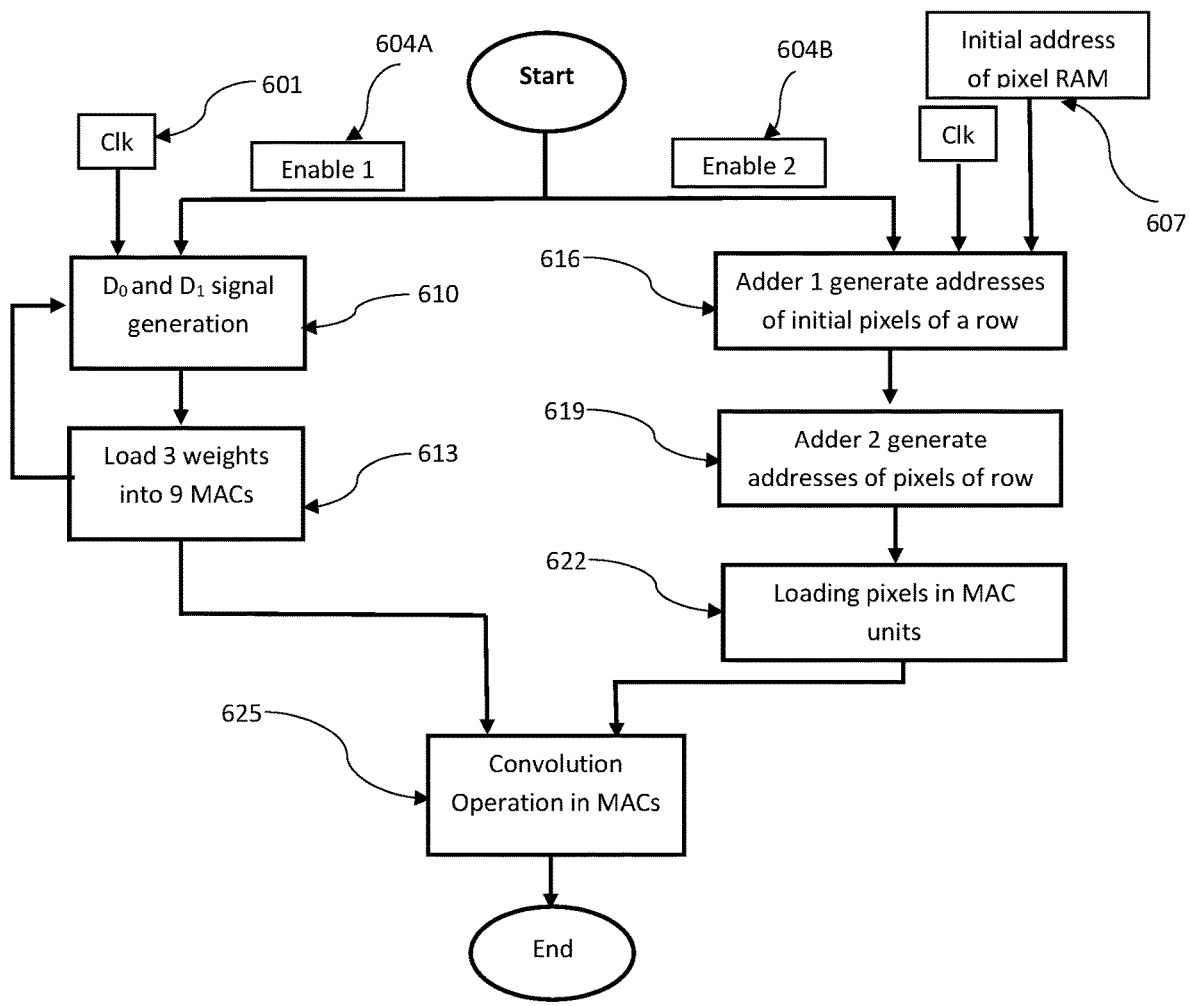
FIG. 6 shows the flow diagram of the working of the entire accelerator system.

In FIG. 4, unit 428 is in the same global clock domain as 601 and 304 in FIG. 6 and FIG. 3 respectively. According to yet another optional but additional aspect of the invention, a controller has been designed and included in the system architecture to aid the functioning of loading units efficiently. Controller will generate 425 to activate the pixel loading unit. 422 is the input to the loading unit which is the initial address of the on chip pixel RAM. Unit 401 generates the addresses of the first pixel of each row with the help of 419. In 419, 'P' is the size of input image pixel and 'n' is the integer value started from 0 to P. When the kernels move over the pixels, 407 generates addresses of corresponding pixel values. State of 404 depends on the size of the input image. Unit 410 gives the pixel values of the generated addresses and stored in 413A to 413E pixel FIFO of depth 4 and size similar to pixel size. Specific pixel values are stored in respective 416 unit for further processing.

Figure 5:
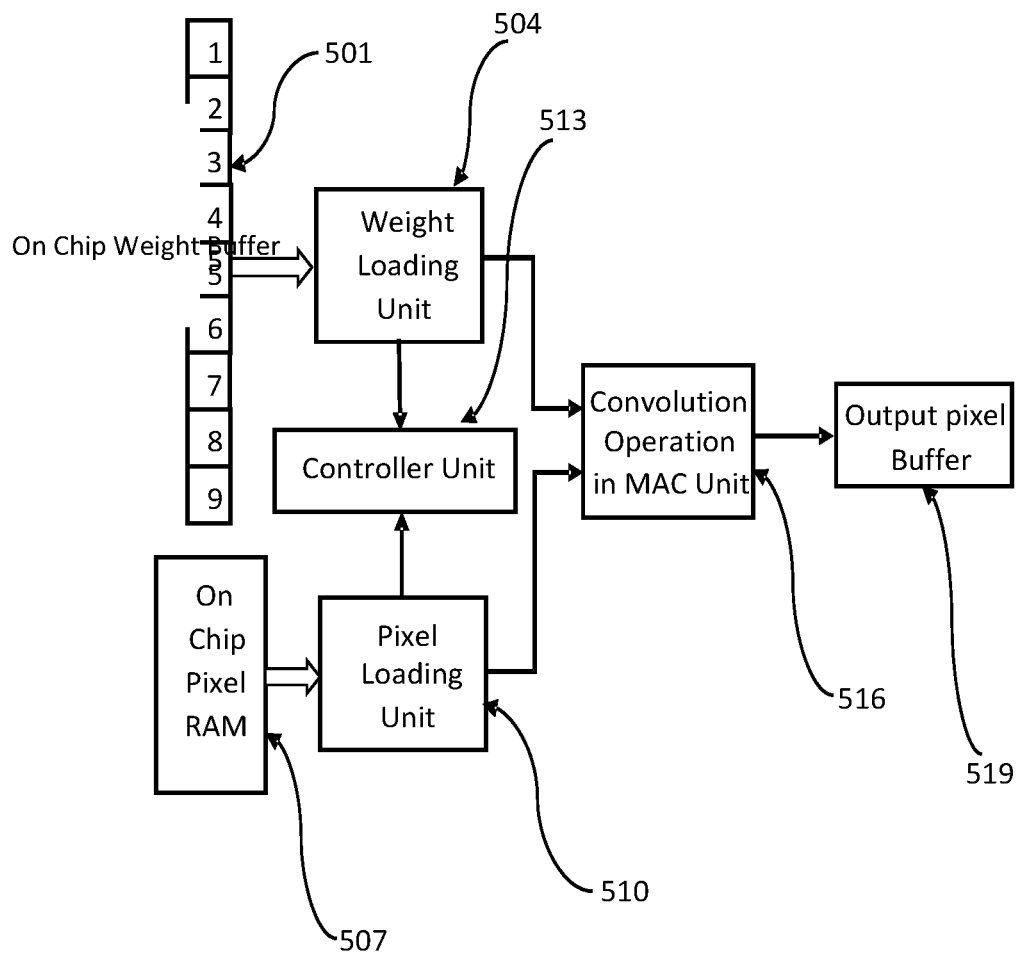
FIG. 5 depicts the overview of disclosed accelerator architecture.

FIG. 5 depicts the overview of proposed accelerator architecture; 501 represents the on chip weight buffer of depth one and size similar to the weight, and 507 is the on chip dual port RAM to store entire input pixels value. Units 504 and 510 are the prime components of the accelerator architecture design to load network parameter weight and pixel respectively. Unit 513 is the controller unit which controls the proper functioning of loading units. Unit 516 is the array of MAC units which conducts the entire convolution operation and convolved output pixel is stored in 519, which is an on chip output pixel buffer.

FIG. 6 shows the flow diagram of the working of the entire accelerator system. Unit 601 is the global clock for the system which keeps all the components synchronized. 604A enables weight loading unit and generates 610 signals and enables 613 to load weights into the nine MACs for convolution operation. This cycles repeats for three times to generate three output pixels with nine weights. Similarly, 604B enables weight loading unit and unit 616 generate addresses of the first pixel of the row by taking 601 and 607 as input. Unit 619 generates subsequent addresses of row pixels with the help of a counter and 622 completes the loading of weight pixels into MACs. Finally, in 625 convolution operation is performed.

The convolution processing unit was verified on a Kintex FPGA model XC7K325T-2FFG900C (Xilinx Inc., San Jose, Calif., USA) device and found to be 1.7 times faster than a conventional convolution processing architecture for an image size of 32×32 pixels. Those skilled in the art may appreciate that implementation on other devices such as Arria 10 FPGA-SoC 10AS066N3F40E2SG (Intel Corp., Santa Clara, Calif., USA) and Polar Fire FPGA MPF500T-1FCG1152I (Microsemi Corp., Aliso Viejo, Calif., USA) are possible.

We claim:

1. A hardware accelerator for image processing and method of its operation comprising:
   a means to store pixels;
   a means to store weights;
   at least two loading units, one being a weight loading unit and another being a pixel loading unit;
   a means to control retrieval of pixels and weights and their simultaneous transmission to at least one or a plurality of computational processing arithmetic units;
   a means to conduct arithmetic operations using a kernel size specific to the number of arithmetic units interconnected via overlapping paths by segmenting kernels of k×k number of weights into a plurality of smaller matrices of k×<k weights and concurrently convolving said matrices of weights with pixels obtained from more than k rows of an input image to produce at least k output pixels (wherein k is defined as an integer greater than one, wherein k is the number of pixels in a row or a column of a sub-matrix that is part of an image matrix or a weight matrix) simultaneously that result in concurrent distribution of pixels and weights input from loading units and produce a plurality of output pixels concurrently that results in additional computational throughput without using extra arithmetic units or other associated hardware computational processing;
   a means to buffer output pixels;
   segmentation of input image pixels into a plurality of matrices each with k rows and less than k columns;
   loading of pixels and weights to computational processing arithmetic units simultaneously;
   convolution of spatially adjacent pixels of said input image with weights.

2. A hardware accelerator of claim 1 wherein the computational processing is a combination of Multiply and Accumulate arithmetic operations.

3. A hardware accelerator of claim 2 wherein multiple Multiply-Accumulate units are deployed concurrently depending on size of input image.

4. A hardware accelerator of claim 1 wherein the said accelerator is used for a Convolutional Neural Network improving its performance by increasing speed of convolution operation by functioning of convolution processing units in parallel.

5. A hardware accelerator of claim 1 wherein said architecture and means utilize hardware computational resource efficiently by reduced number of pixel and weight loading cycles.

6. A hardware accelerator of claim 1 wherein said architecture and means utilizing hardware computational resource efficiently reduces computation cost.

7. A hardware accelerator of claim 1 wherein said architecture and means utilizing hardware computational resource efficiently reduces power consumption.

8. A method of operation of claim 1 wherein the convolution is conducted concurrently deploying multiple Multiply-Accumulate units.

9. A method of operation of claim 1 wherein the weights correspond to a plurality of matrices of pixels that overlap over each other.

* * * * *